(12) United States Patent
Briskman et al.

(10) Patent No.: US 6,564,053 B1
(45) Date of Patent: May 13, 2003

(54) EFFICIENT HIGH LATITUDE SERVICE AREA SATELLITE MOBILE BROADCASTING SYSTEMS

(75) Inventors: Robert D. Briskman, North Bethesda, MD (US); Robert A. Nelson, Bethesda, MD (US)

(73) Assignee: Sirius Satellite Radio Inc., New York City, NY (US)

( * ) Notice: Subject to any disclaimer, the term of this patent is extended or adjusted under 35 U.S.C. 154(b) by 57 days.

(21) Appl. No.: 09/692,780

(22) Filed: Oct. 19, 2000

Related U.S. Application Data (63) Continuation of application No. 09/082,489, filed on May 20, 1998, now Pat. No. 6,223,019.

(51) Int. Cl.$^7$ ................................................. H04B 1/69
(52) U.S. Cl. ........................ 455/427; 455/429; 455/13.1; 455/13.2; 370/324; 244/158 R
(58) Field of Search ................................ 455/427, 429, 455/13.1, 13.2, 3.01, 3.02; 370/316, 319–325; 244/158 R; 342/352, 356

(56) References Cited

U.S. PATENT DOCUMENTS

| | | |
|---|---|---|
| 2,959,644 A | 11/1960 | Grace |
| 3,163,820 A | 12/1964 | Hight |
| 3,825,837 A | 7/1974 | Briskman |
| 3,836,969 A | 9/1974 | Bond et al. |
| 3,995,111 A | 11/1976 | Tsuji et al. |
| 4,021,737 A | 5/1977 | Trask |
| 4,038,600 A | 7/1977 | Thomas |
| 4,286,262 A | 8/1981 | Wahl |
| 4,291,409 A | 9/1981 | Weinberg et al. |
| 4,291,410 A | 9/1981 | Caples et al. |
| 4,502,051 A | 2/1985 | Dondl |
| 4,532,635 A | 7/1985 | Mangulis |
| 4,535,476 A | 8/1985 | Carlin |
| 4,560,945 A | 12/1985 | Olver |
| 4,588,958 A | 5/1986 | Katz et al. |
| 4,630,058 A | 12/1986 | Brown |
| 4,640,987 A | 2/1987 | Tsukada et al. |
| 4,652,884 A | 3/1987 | Starker |
| 4,660,196 A | 4/1987 | Gray et al. |
| 4,685,133 A | 8/1987 | Iggulden |
| 4,712,250 A | 12/1987 | Michels et al. |

(List continued on next page.)

FOREIGN PATENT DOCUMENTS

| | | |
|---|---|---|
| GB | 2098821 A | 11/1982 |
| GB | 2313743 | 12/1997 |
| JP | 358019782 A | 7/1981 |
| JP | 62-58732 A | 3/1987 |
| WO | WO 91/07025 | 5/1991 |

OTHER PUBLICATIONS

Institute of Electrical and Electronics Engineers, Inc.; Time–Diversity Scheduled Retransmission Multiaccess Protocols for Satellite Networks, 1991, i–ii and 1544–1548.

Robert D. Briskman, Dar Mobile Demonstration, 1994, cover page, 1145–1151.

Hajime Fukuchi, Slant Path Attenuation Analysis at 20 GHz for Time–Diversity Reception of Future Satellite Broadcasting, unknown, 6.5.1–6.5.4.

Takeshi Hattori et al., Theoretical Studies of a Simulcast Digital Radio Paging System Using a Carrier Frequency Offset Strategy, 1980, 87–95.

P.A. Ratliff, UHF Satellite Sound Broadcasting Technology, 1988, 0141–0146.

K. Galligan et al., Opportunities for Sound Broadcasting Using Non–Geostationary Satellites, 1991, 64–76.

(List continued on next page.)

Primary Examiner—Lester G. Kincaid
(74) Attorney, Agent, or Firm—Patrick F. Bright, Esq.; Bright & Lorig (57) ABSTRACT

Satellite audio broadcasting systems include orbital constellations for providing high elevation angle coverage of audio broadcast signals from the constellation's satellites to fixed and mobile receivers within service areas located at geographical latitudes well removed from the equator.

37 Claims, 13 Drawing Sheets

U.S. PATENT DOCUMENTS

| | | |
|---|---|---|
| 4,720,873 A | 1/1988 | Goodman et al. |
| 4,731,866 A | 3/1988 | Muratani et al. |
| 4,742,410 A | 5/1988 | Smith |
| 4,801,940 A | 1/1989 | Ma et al. |
| 4,809,935 A | 3/1989 | Draim |
| 4,823,341 A | 4/1989 | Rosen |
| 4,829,570 A | 5/1989 | Schotz |
| 4,831,619 A | 5/1989 | Rosen |
| 4,879,711 A | 11/1989 | Rosen |
| 4,901,307 A | 2/1990 | Gilhousen et al. |
| 4,908,847 A | 3/1990 | Hannon et al. |
| 4,910,792 A | 3/1990 | Takahata et al. |
| 4,943,808 A | 7/1990 | Dulck et al. |
| 5,015,965 A | 5/1991 | Katz et al. |
| 5,017,926 A | 5/1991 | Ames et al. |
| 5,036,523 A | 7/1991 | Briskman |
| 5,038,341 A | 8/1991 | Berman et al. |
| 5,048,118 A | 9/1991 | Brooks et al. |
| 5,073,900 A | 12/1991 | Mallinckrodt |
| 5,093,839 A | 3/1992 | Kohno et al. |
| 5,126,748 A | 6/1992 | Ames et al. |
| 5,138,275 A | 8/1992 | Abbiati et al. |
| 5,148,452 A | 9/1992 | Kennedy et al. |
| 5,153,598 A | 10/1992 | Alves, Jr. |
| 5,155,494 A | 10/1992 | Bryant et al. |
| 5,175,557 A | 12/1992 | King et al. |
| 5,203,018 A | 4/1993 | Hirose |
| 5,233,626 A | 8/1993 | Ames |
| 5,239,670 A | 8/1993 | Schwendeman et al. |
| 5,251,328 A | 10/1993 | Shaw |
| 5,274,840 A | 12/1993 | Schwendeman |
| 5,278,863 A | 1/1994 | Briskman |
| 5,283,780 A | 2/1994 | Schuchman et al. |
| 5,303,393 A | 4/1994 | Noreen et al. |
| 5,319,673 A | 6/1994 | Briskman |
| 5,319,716 A | 6/1994 | McGreevy |
| 5,326,054 A | 7/1994 | Turner |
| 5,345,244 A | 9/1994 | Gildea et al. |
| 5,349,606 A | 9/1994 | Lovell et al. |
| 5,408,686 A | 4/1995 | Mankovitz |
| 5,408,699 A | 4/1995 | Yamashita et al. |
| 5,433,726 A | 7/1995 | Horstein et al. |
| 5,439,190 A | 8/1995 | Horstein et al. |
| 5,448,757 A | 9/1995 | Hirata |
| 5,455,823 A | 10/1995 | Noreen et al. |
| 5,485,485 A | 1/1996 | Briskman et al. |
| 5,500,856 A | 3/1996 | Nagase et al. |
| 5,507,454 A | 4/1996 | Dulck |
| 5,508,756 A | 4/1996 | Landy et al. |
| 5,509,028 A | 4/1996 | Marque-Pucheu |
| 5,526,284 A | 6/1996 | Mankovitz |
| 5,551,065 A | 8/1996 | Honore |
| 5,582,367 A | 12/1996 | Castiel et al. |
| 5,592,471 A | 1/1997 | Briskman |
| 5,638,399 A | 6/1997 | Schuchman et al. |
| 5,641,134 A | 6/1997 | Vatt |
| 5,652,765 A | 7/1997 | Adachi et al. |
| 5,669,585 A | 9/1997 | Castiel et al. |
| 5,678,175 A | 10/1997 | Stuart et al. |
| 5,794,891 A | 8/1998 | Polle et al. |
| 5,871,181 A | 2/1999 | Mass |
| 5,970,085 A | 10/1999 | Yi |
| 6,325,332 B1 * | 12/2001 | Cellier et al. ........... 244/158 R |

OTHER PUBLICATIONS

Robert D. Briskman, Montreux, Engineering Symposium Record, 4th Edition, Jun. 1998, cover page, pp. 46–55.

Annex 1 to (Doc. 2–2/TEMP/18(Rev.2)), System Parameters Relevant to Sharing Studies of Proposed BSS(S) and BS(S) Systems.

Bousquet, et al.;, Orbital Aspects and Useful Relations from Earth Satellite Geometry in the Frame of Future Mobile Satellite Systems; Jan. 1, 1990, pp. 783–789.

Carnebianca, C.; Regional to Global Satellite Based Navigation Systems; Jan. 1, 1988; pp. 25–33.

Ashton, C. J.; Archimedes—Land Mobile Communications from Highly Inclined Satellite Orbits; Jan. 1, 1988; pp. 133–137.

Ahmed, M. Jamil; Terrain and Coverage Prediction Analyses for Non–Geostationary Orbit EHF Satellite Communications; Feb. 1, 1993; pp. 18–1–18–11.

Stuart, J.R. et al.; Mobile Satellite Communications from Highly Inclined Elliptic Orbits; Jan. 1, 1988; pp. 535–541.

Rodinelli, G. et al.; Orbit Control Strategy for a Constellation of Three Satellite in Tundra Orbits Jan. 1, 1990; pp. 697–708.

Rodinelli, G. et al.; Attitude Control for Small Satellites on Inclined Eccentric Orbits; Oct. 1, 1990; ten pages (total).

Giovagnoli, F.; Mini–Satellites—Aerospatiale Developments; Oct. 1, 1990; 10 pages (total).

Norbury, J.R.; Mobile Satellite System for Europe—Which is the Optimum Orbit Configuration; Oct. 1, 1987; pp. 1–5.

Lynch, Michael J.; Alternative Orbits for Commercial Communication Networks; Jan. 1, 1992; pp. 1370–1376.

Lecohier, G. et al.; Eruopean Molniya and Tundra Orbit Control; Jan. 1, 1990; pp. 165–191.

Acker, William F.; Small Satellite Constellations for EHF Polar Coverage; Jan. 1, 1990; pp. 1–15.

Jayasuriya, D. A. R. et al.; Comparison of Frequency Sharing Aspects of Satellites in Elliptical Orbits and the Geostationary Orbit; Jan. 1, 1988; pp. 154–157.

Cramarossa, A. et al.; Low Cost Station Keeping Maneuvers for a Small–Satellites Constellation in Tundra Orbits; Sep., 1988; pp. 1–11.

Mitchell, B. J. et al.; Communications Satellite Design: Physics and Economics; the Journal of Practical Applications in Space; 1992; pp. 1–24.

Glover, Alexi; Space Environments and Effects Analysis Section; Radiation Level Survey; three pages (total).

Perrotta, Giorgio et al.; Properties of a Class of Elliptical Sunsynchronous Orbits for REegional Communictions and Remote Sensing; Aug., 1995; pp. 1–17.

Wadsworth, "Longitudinal Reuse Plan Doubles Communication Satellite Capacity of Geostationary Arc" 1980.

Draim, "Satellite Constellations for Optimum Northern Hemisphere Coverage," 10/83.

* cited by examiner

FIG. 1
CONUS FROM 101° W LONGITUDE

FIG. 2  ------ 60 DEGREE ELEVATION THRESHOLD

FIG. 3  ------ 60 DEGREE ELEVATION THRESHOLD

FIG. 4 ------ 60 DEGREE ELEVATION THRESHOLD

FIG. 5 ——— 60 DEGREE ELEVATION THRESHOLD

SATELLITE GROUND TRACE AT END OF LIFE (15 YEARS, NO STATIONKEEPING)
$i = 65.6°, e = 0.6264, \omega = 253°, \Omega = 8.0°$

EFFICIENT HIGH LATITUDE SERVICE AREA SATELLITE MOBILE BROADCASTING SYSTEMS

CROSS REFERENCES TO RELATED APPLICATIONS

This is a continuation of U.S. patent application Ser. No. 09/082,489, filed May 20, 1998, now U.S. Pat. No. 6,223,019.

BACKGROUND OF THE INVENTION

Figure 1:
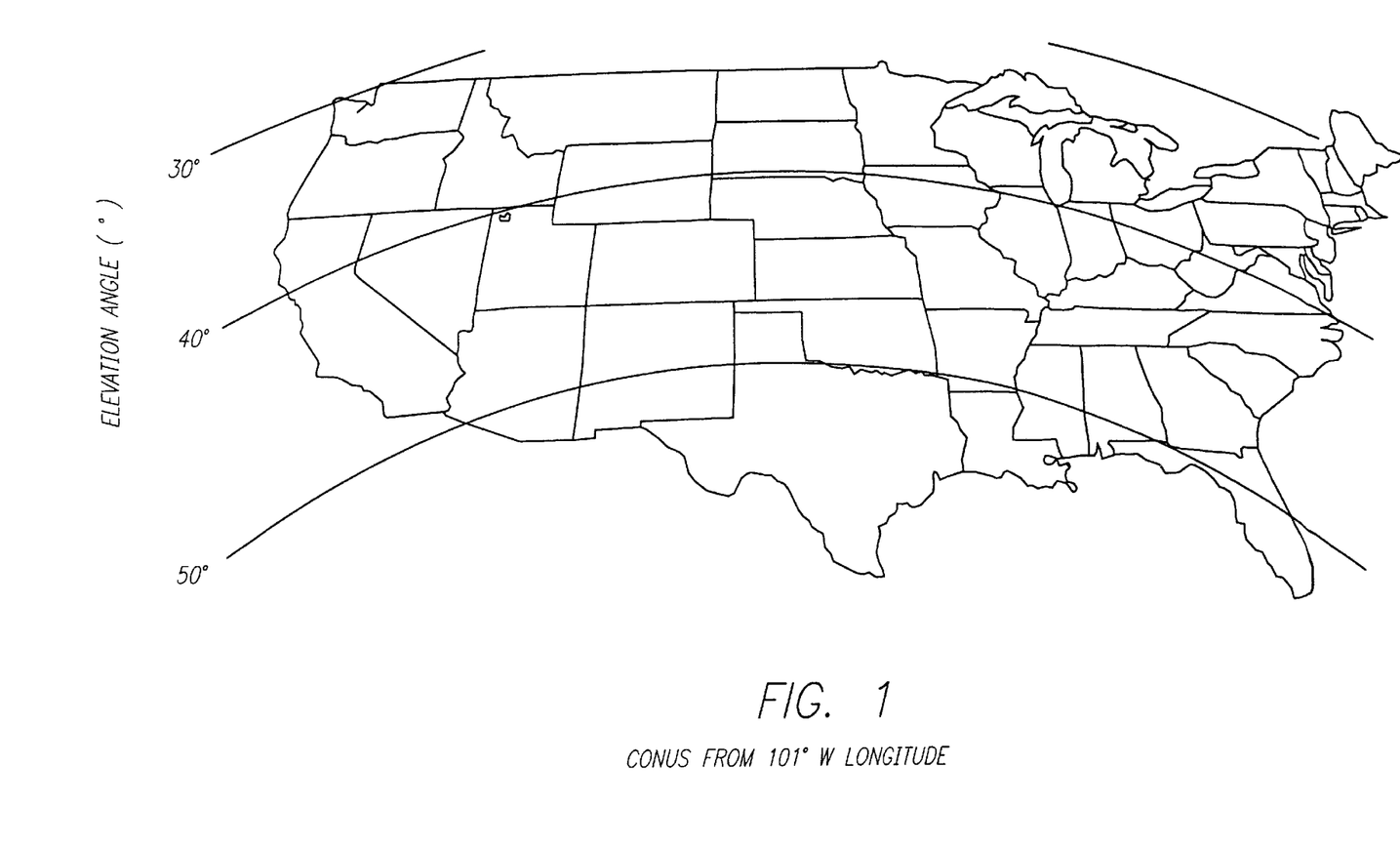
FIG. 1 shows the elevation angles at mobile receivers in the 48 contiguous United States for the optimum location of a geostationary satellite (which is appropriately 101° W. Longitude on the equator). Most of the northern United States has elevation angles in the 30°–35° range which could be lower in practice due to mobile platform tilt. Canada, Japan and most of Europe are at lower elevation angles from optimally located geostationary satellites due to their higher latitudes.
Figure 2:
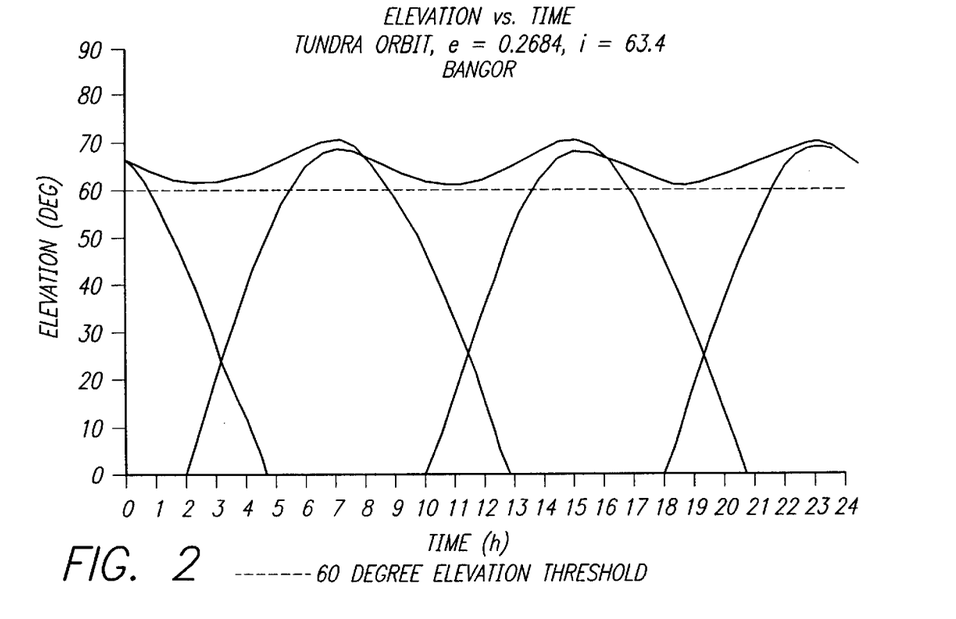
FIG. 2 shows the elevation angles for a constellation of three satellites with orbits optimized for the 48 contiguous United States using the methods and techniques of the invention for Bangor, Me.

Satellite broadcasting systems to mobile receivers have been proposed for radio ("Satellite DAB," *International Journal of Communications;* Robert D. Briskman; Vol. 13, February 1995, pp. 259–266) and other broadcast services, such as television or data from satellites at 35,786 km altitude located at or near the equatorial plane. These satellites well serve geographical regions at low and mid-latitudes but, as the latitude becomes higher, the elevation angles to the satellites decrease as shown in FIG. 1. High elevation angles are most desirable in satellite broadcast systems using mobile receivers to reduce service outages from physical blockage, multipath fading and foliage attenuation. Recognition of this has led to satellite systems using 12-hour inclined elliptical orbits such as the Molniya communications satellites and the proposed Archimedes radio broadcast system. These systems are not efficient since many satellites are required for continuous coverage of practical service areas and the satellites' electronics and solar power subsystems are degraded by the four times daily passage through the Van Allen radiation belts surrounding the earth. The systems and methods of this invention surmount these problems.

SUMMARY OF THE INVENTION

The systems and methods of this invention use satellites in 24 sidereal hour orbits (geosynchronous) with inclinations, orbital planes, right ascensions and eccentricities chosen to optimize coverage of a particular service area, region or country located at high latitudes. In contrast to the elevation angles of FIG. 1, a satellite constellation of two, three or more satellites can provide during all or most of every day 50°–60° elevation angles throughout a large service area located at high latitudes. The satellites' orbits can also be configured to avoid most of the radiation from the Van Allen belts.

Figure 13:
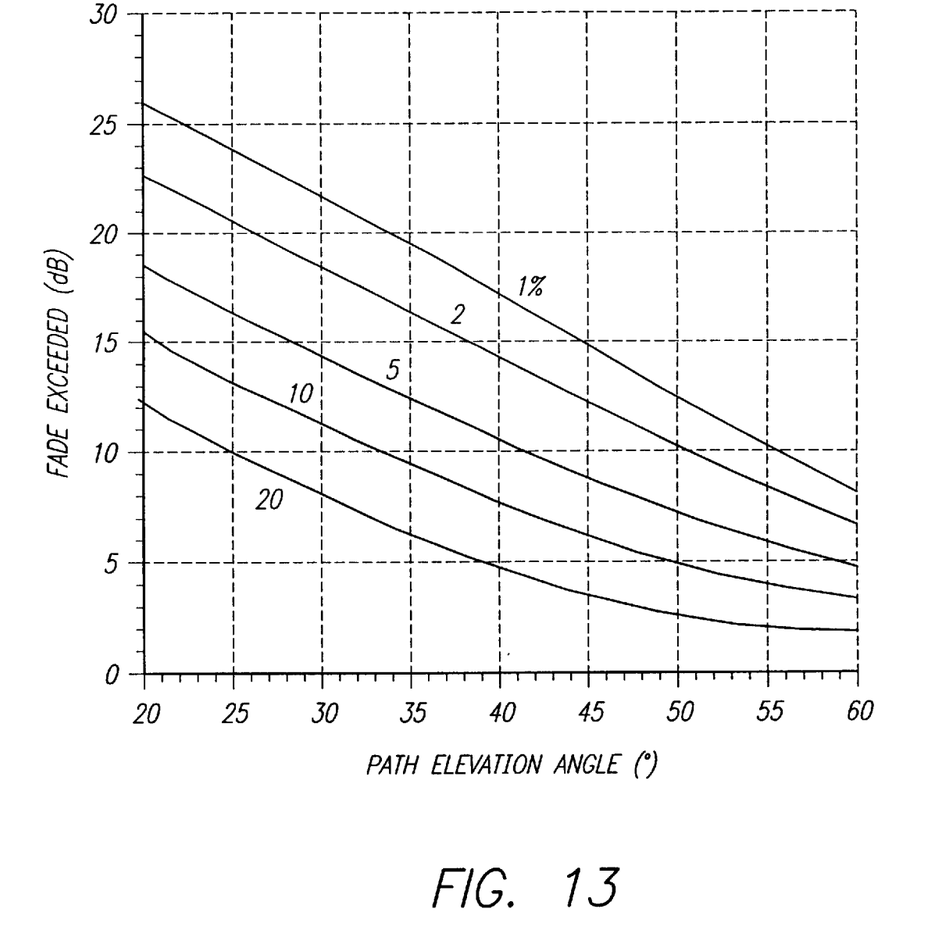
FIG. 13 shows the fade margin required to overcome roadside shadowing from trees and leaves measured at L-band frequencies (1–2 GHz) in the 48 contiguous United States as a function of service unavailability and elevation angle. In cases where modest availability (e.g., 90% or 10% unavailability) is required any where moderate improvement in elevation angle coverage is implemented, the fade margin improvement will be several decibels. In cases where high availability (e.g., 99% or 1% unavailability) is required and where large improvement in elevation angle coverage is implemented, the fade margin improvement will be in the 12–14 dB range (i.e., 20 times). Reductions in required fade margins can be used by the satellite system designer to employ smaller, less expensive satellites or more audio program channels or combinations thereof.

Satellite systems of this invention, in preferred embodiments, serve geographical latitude service areas located at greater than approximately 30° N or 30° S by providing high elevation angles to mobile receivers in such areas for reception of broadcasting transmissions over all or most of the day. The preferred systems use geosynchronous satellites (i.e., having a 24 sidereal hour orbital period —86,164 seconds) in a constellation. The design of the constellation is configured to optimize the elevation angle coverage of a particular geographical high latitude service area for achieving minimum physical blockage, low tree foliage attenuation and small probabilities of multipath fading. For instance, 13 shows an improvement in foliage attenuation at a 1.5 GHz transmission frequency of many decibels for high service reliabilities when the reception elevation angel is doubled. Such dramatic improvement also occur for other Similar improvements occur for other microwave frequencies and for other service reliabilities.

The configuration design optimization is achieved by selection of the orbital parameters of the constellation's satellites and the number of satellites in the constellation. Satellite audio broadcasting systems to mobile receivers generally provide multichannel radio service and the satellite transmissions are nominally between 1–4 GHz.

Inclination. The inclination of the satellites is generally chosen between about 40° and about 80° so they cover the desired high latitude service areas during their transit overhead.

Eccentricity. The eccentricity is chosen to have a high apogee over the service area so the satellites spend the maximum amount of time overhead. Practically, the eccentricity is limited by the increased distance that the higher is from the service area since this extra distance must be overcome either by higher satellite transmission power, a more directive satellite antenna during this portion of the orbit or combinations thereof. The eccentricity range in preferred embodiments is from about 0.15 to about 0.30. Eccentricities between about 0.15 and about 0.28 ate highly preferred since they avoid most of the Van Allen belts.

Planes/Number of Satellites. The number of orbital planes equals the number of satellites, and their spacing at the equator is equal to 360° divided by the number of satellites. Preferred embodiments have satellite constellations between 2 and 4 satellites. To illustrate, for a 3-satellite constellation, the satellites would be in orbital planes separated by approximately 120°.

Argument of Perigee. For service to latitude areas above 30° N, the argument of perigee is in the vicinity of 270° so that the apogee is in the northern hemisphere and the perigee is in the southern hemisphere. For service to latitude areas below 30° S, the argument of perigee is in the vicinity of 90° so that the apogee is in the southern hemisphere and the perigee is in the northern hemisphere.

Longitude of the Ascending Node. The orbit planes are chosen with a longitude of the ascending node such that the satellites have a good view (i.e., are at high elevation angles as viewed by mobile receivers) of the complete service area. Generally, this is accomplished by choosing the right ascension of the ascending node and the mean anomaly such that the center of the ground trace bisects the service area.

Ground Trace. In the preferred embodiment, the satellites follow the same ground trace and pass over a given point on the earth at approximately equal time intervals. The orbit of each satellite occupies its own orbital plane. For satellites in neighboring planes in a constellation of n satellites, the difference in right ascensions of the ascending nodes is 360°/n, the difference in mean anomalies is 360°/n and the average time phasing between the satellites on the trace is 24 sidereal hours/n.

Orbit Control. Satellite constellations of this invention experience change in the aforementioned orbital parameters over time due to the earth's oblateness, gravity forces of the sun, moon and solar radiation pressure. These can be compensated by the satellites' on-board propulsion system. The amount of such propulsion can be minimized by analyzing the perturbations of each individual orbit parameter over the lifetimes of the satellites caused by the previously mentioned effects and choosing the initial conditions of the orbits so the minimum on-orbit changes are required. This choice is generally assisted by the fact that some perturbation sources partially cancel out others.

Figure 3:
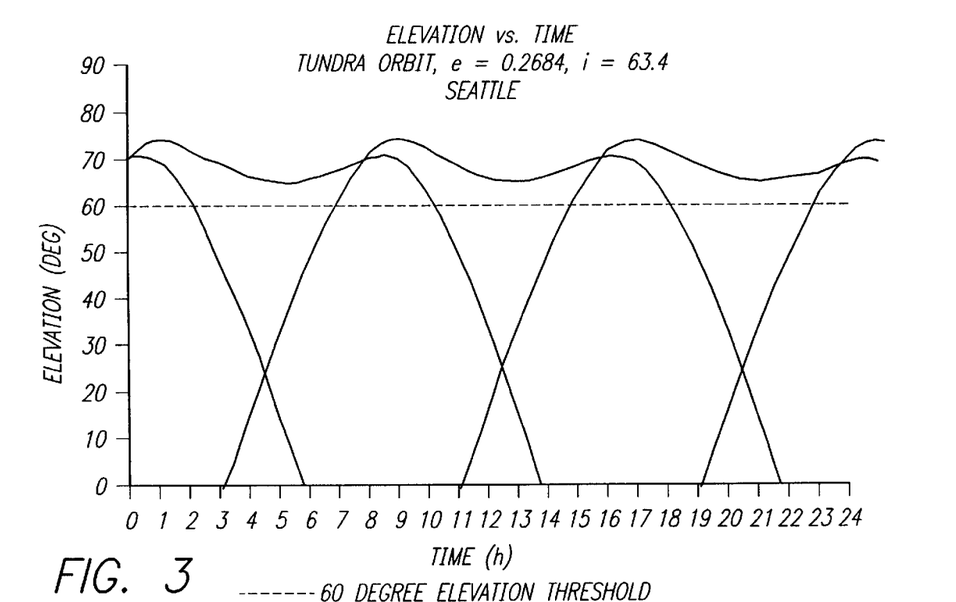
FIG. 3 for Seattle, Wash.
Figure 4:
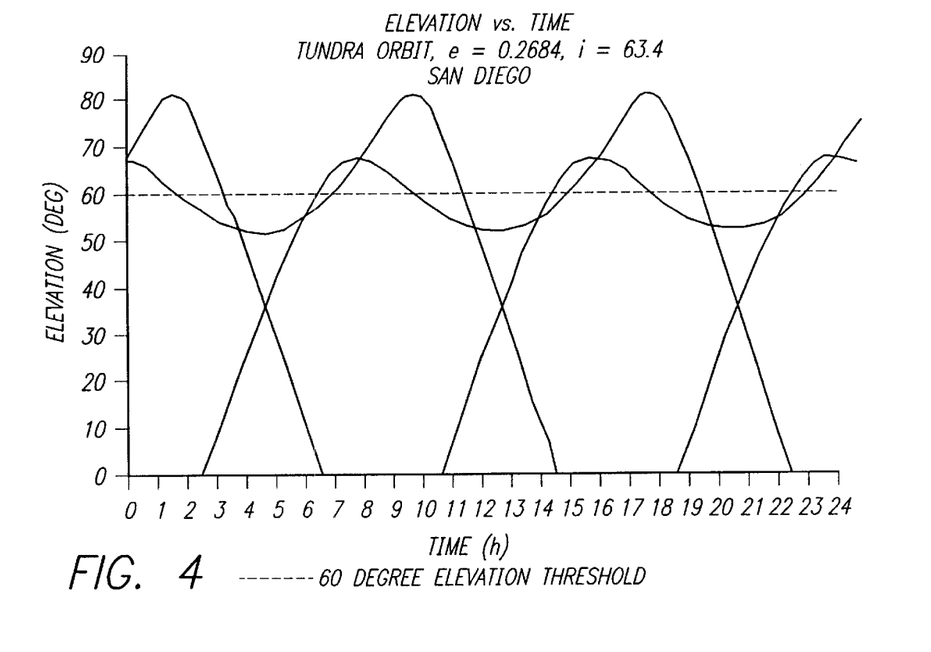
FIG. 4 for San Diego, Calif.
Figure 5:
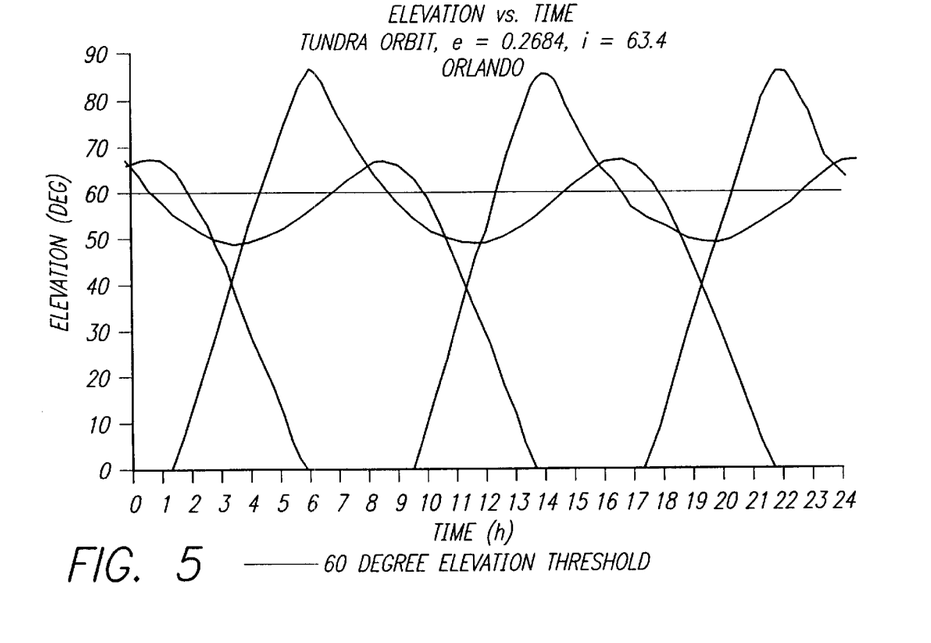
FIG. 5 for Orlando, Fla.
Figure 6:
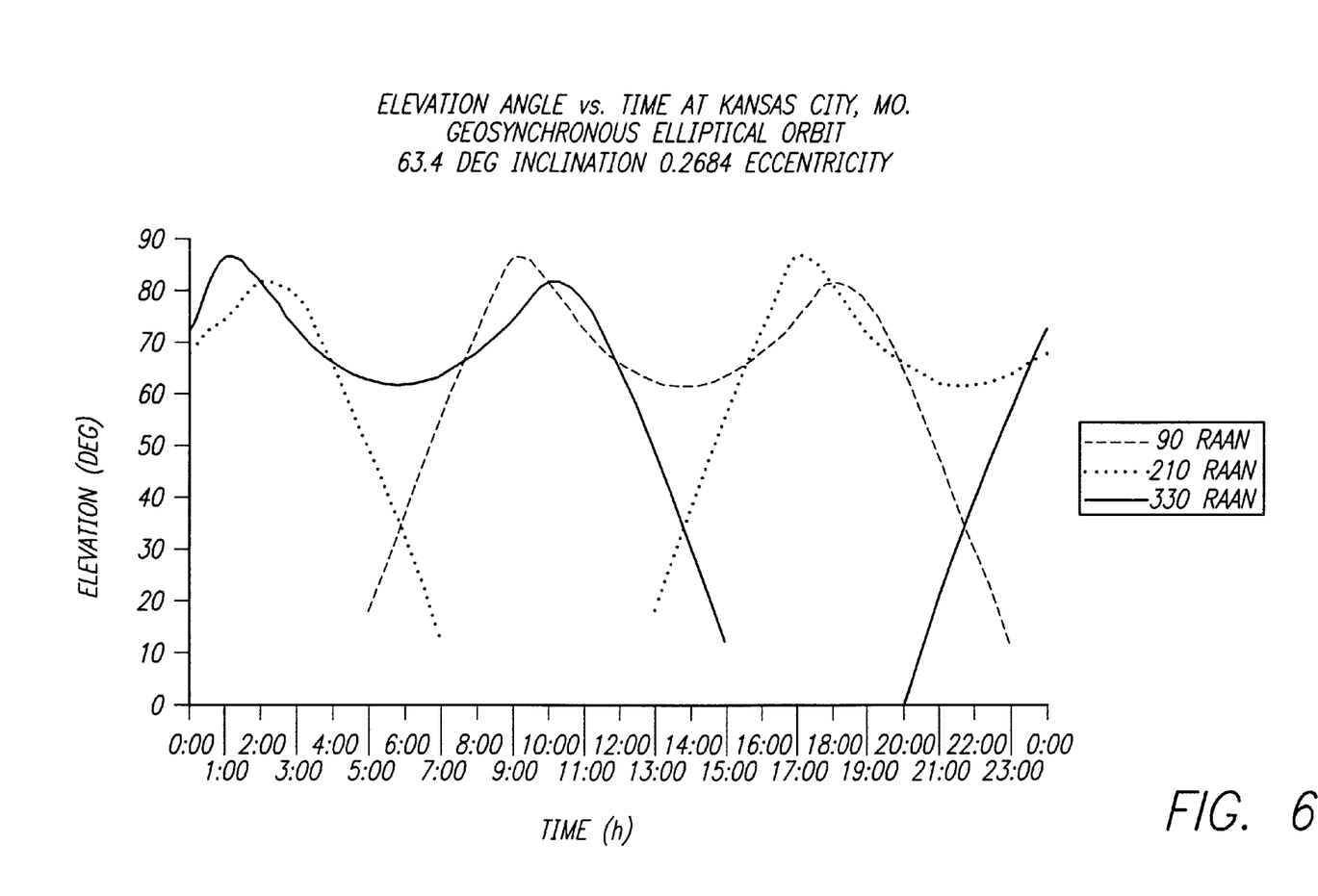
Figure 7:
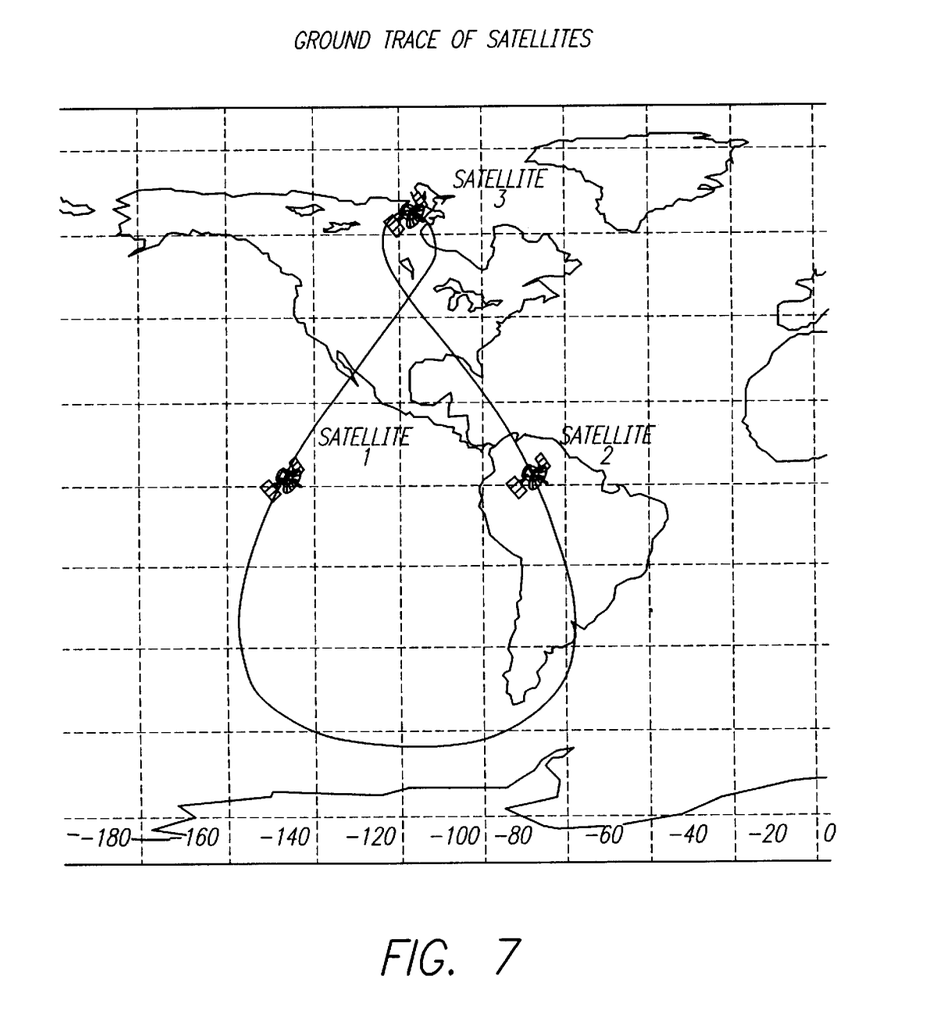

Satellite Spatial and Time Diversity. FIG. 3 shows the elevation angle coverage from Seattle, Wash. to a three-satellite constellation optimized by the methods described herein for broadcast service to the United States of America. Two satellites are visible at all times. The techniques for satellite spatial and time diversity described in U.S. Pat. No. 5,319,672 dated Jun. 7, 1994; U.S. Pat. No. 5,278,863 dated Jan. 11, 1994 and U.S. Pat. No. 5,592,471 dated Jan. 7, 1997 are fully applicable, and these patents are incorporated herein by reference.

The satellite transmission power margin saved by using the invention for mitigation of multipath fading and for reduction of tree and foliage attenuation can be used to advantage. One use is by employing a smaller, less costly satellite. A second use is by transmitting more program channels.

BRIEF DESCRIPTION OF THE DRAWINGS

The systems and methods of this invention can better be understood by reference to the drawings, in which:

FIG. 6 for Kansas City, Mo. The constellation provides one satellite at all times above 60° elevation angle throughout the northern United States and a second one at most times above 30° elevation angle.

FIG. 7 depicts the ground trace of the satellites. With single satellite which provides no mitigation of multipath fading, a constellation of two satellites is feasible as shown in FIG. 8 for New York City. Conversely, a four satellite constellation would provide multiple satellite coverage at higher elevation angles than FIG. 2–6.

DESCRIPTION OF PREFERRED EMBODIMENTS

The systems and methods of the invention are best described by enumerating the steps employed in the design of an audio satellite broadcast system to mobile receivers for providing service throughout a service area geographically well removed from the equator. The mobile receivers have antennas configured to view the sky where satellites would be visible. The invention is also applicable to fixed location receiver radio broadcast systems. In fact, when a mobil receiver stops, it is essentially a fixed receiver. The fixed location receiver case is less technically simpler, since there is little multipath fading and the blockage encountered is static with time.

Figure 14:
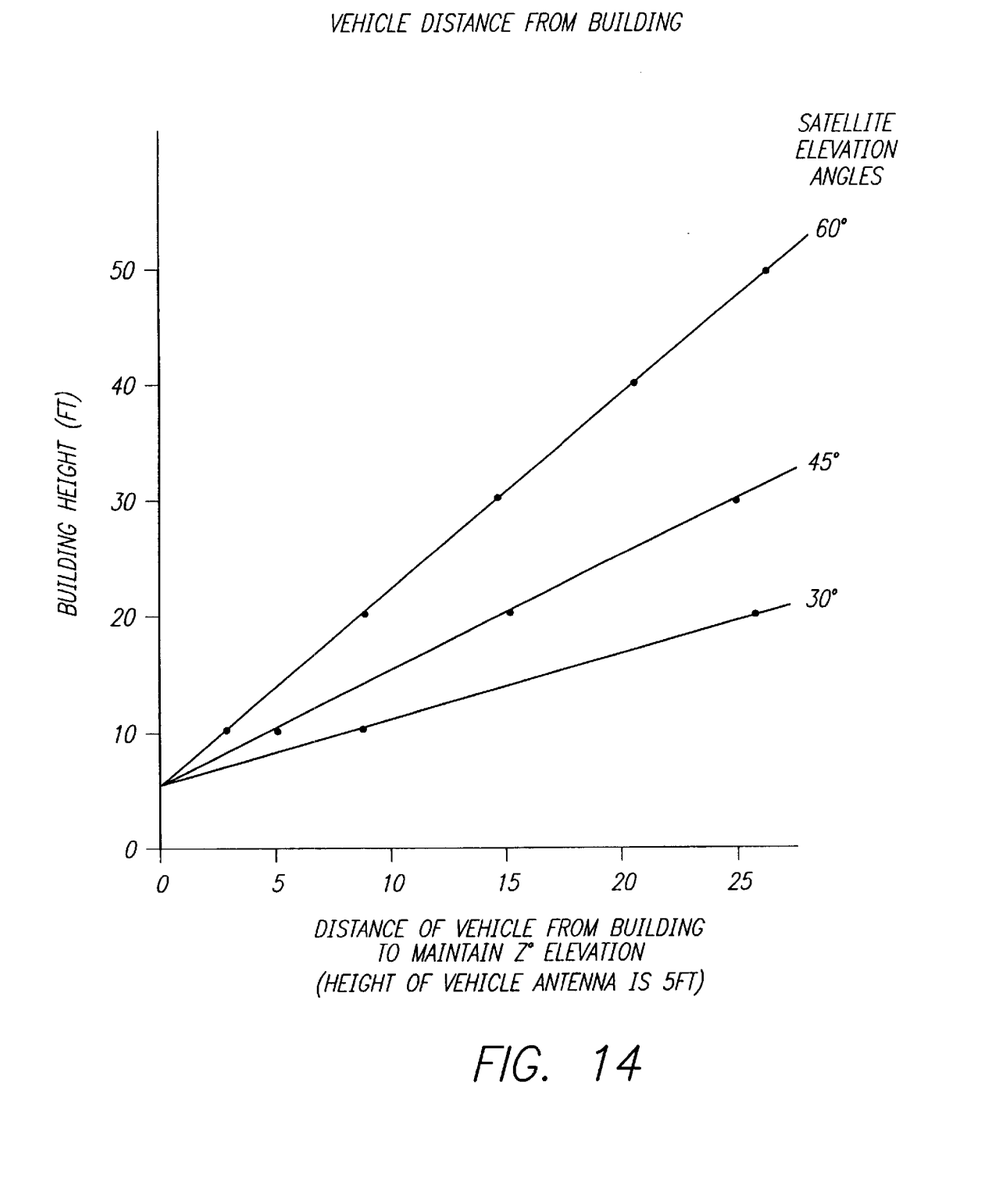
FIG. 14 is a simplified graph which shows the improvement the invention provides in reducing service outages from physical blockages (e.g., buildings, hills, etc.) of the satellite signal from the mobile receiver. The graph shows the worst case distance a car must be away from a building of a certain height to always avoid an outage from blockage as a function of elevation angle to a single satellite. The amount of blockage avoidance varies significantly for an assumed building height with satellite elevation angle improvement. Depending on the improvement in satellite elevation angle coverage, the distance of a mobile receiver from the building can typically be as close as several feet to as far as many yards away and not be affected by blockage.
Figure 15:
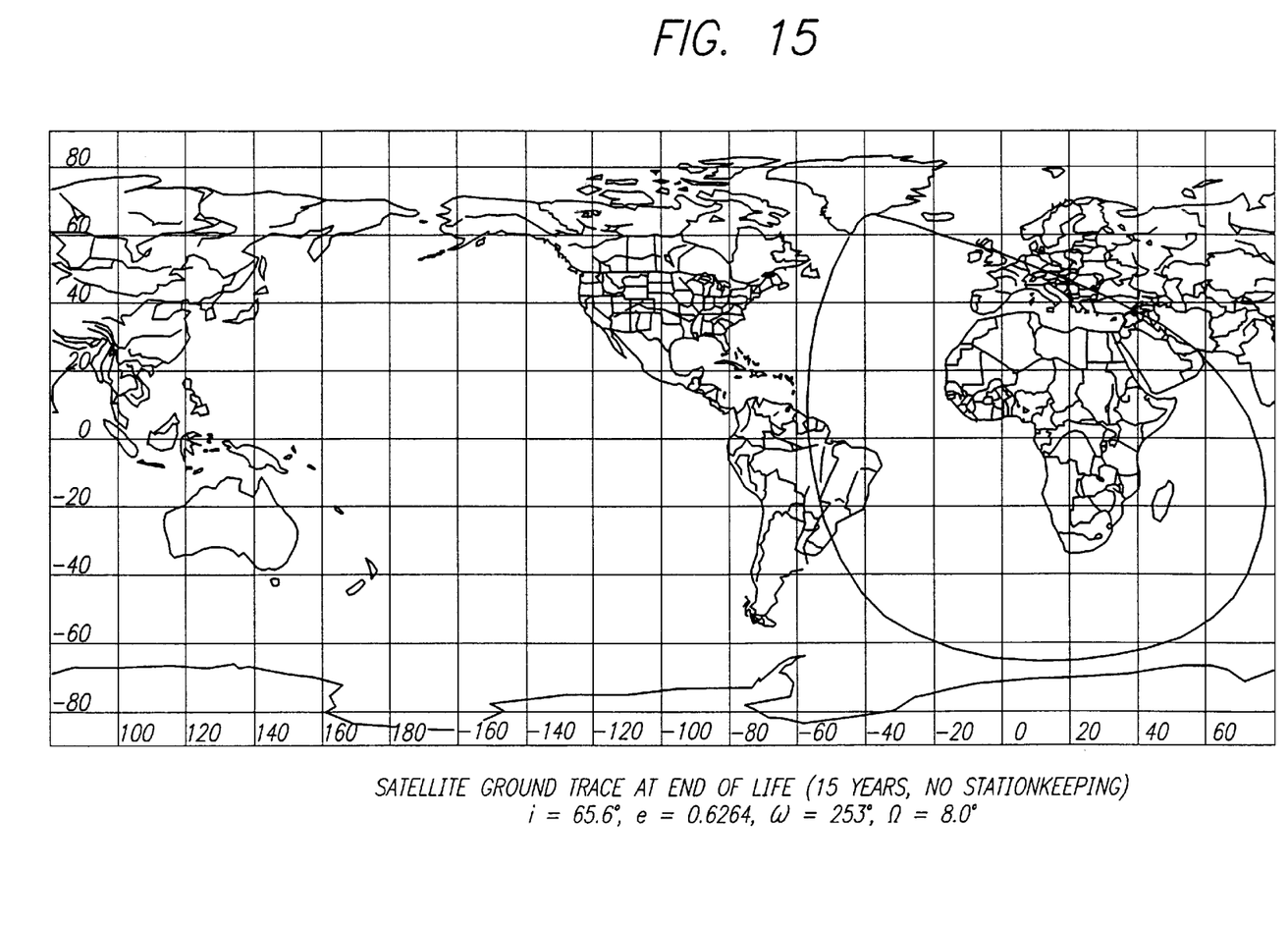
FIG. 15 shows what would happen to the orbit of one of the constellation's satellites, whose ground trace is shown in FIG. 7, if the orbital parameters are not chosen to minimize the orbital perturbations and if no satellite propulsion is used over a fifteen year period to correct the remaining perturbations. The perturbations, caused by gravitational effects of the sun, moon and earth oblateness, and by solar radiation pressure, are a function of the orbits and their epochs (i.e., the actual time of orbit insertion).

The important analysis input parameters are the definition of the geographical service area and the quality of service to be provided. The quality of service is defined as the percent of time service will be unavailable due to outage from physical blockage, multipath and tree/foliage attenuation. The desired satellite elevation angles for minimizing outage from single path physical blockage can be derived from calculations similar to those graphically shown in FIG. 14. Similarly, the desired satellite elevation angles for minimizing outage from tree/foliage attenuation can be derived from transmission measurements in the projected service area at the system's operating radio frequency, such as shown in FIG. 13 for the United States at L-band frequencies, and knowledge of the satellites' transmission signal margin at the mobile receiver. Multipath and total blockage (i.e., all path blockage such as occurs when a mobile receiver passes under a large underpass) are dealt with by use of satellite spatial and time diversity. Diversity is analyzed as a requirement of the number of satellites simultaneously viewable by the mobile receivers and of the satellites' elevation angles.

The results of the aforementioned analyses are then used in the design of the satellite constellation which is a function of the orbital parameters and number of satellites in the constellation. Using known computer analysis programs, an optimization is performed of the elevation angles for the mobile receivers throughout the service area to the constellation's satellites throughout a day (i.e., since the satellites are geosynchronous, the elevation angles will repeat every day if perturbations are ignored). The optimization specifically varies inclination and eccentricity for given right ascensions to maximize the time the satellites remain over the service area (i.e., at high elevation angles). Also, the choice of the apogee and perigee of the orbit considers the avoidance of passage through the Van Allen belts so radiation damage to the satellites is minimized and avoids too high apogees so excess space loss or antenna beam forming is minimized as discussed subsequently.

Figure 8:
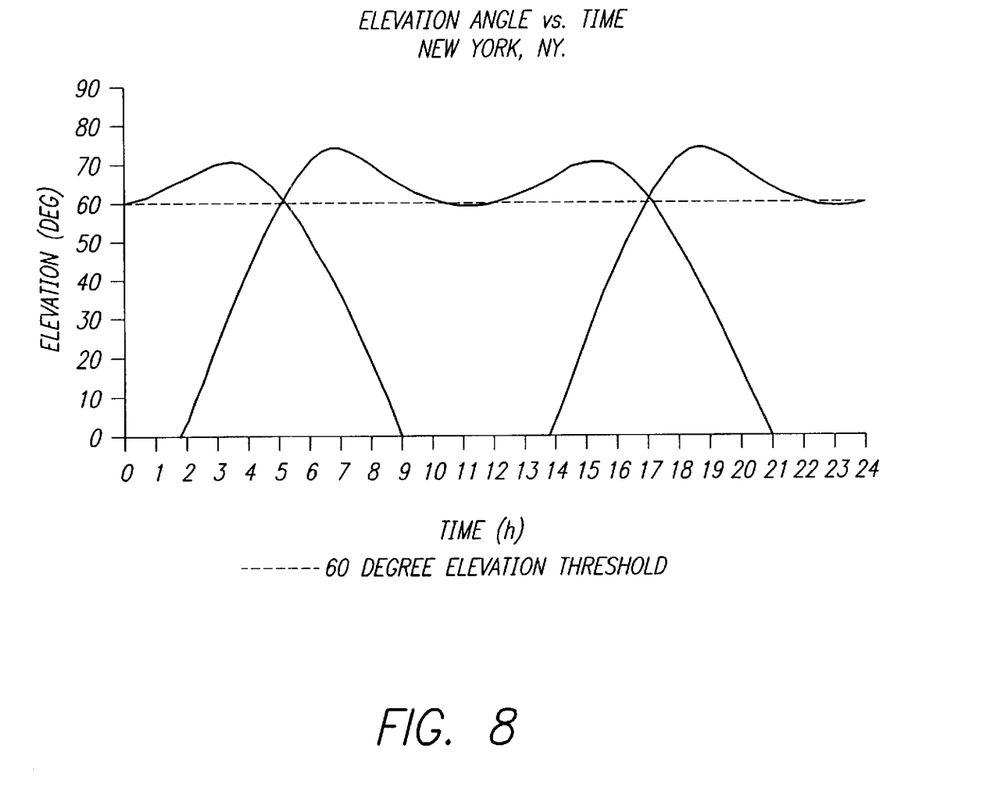
Figure 9:
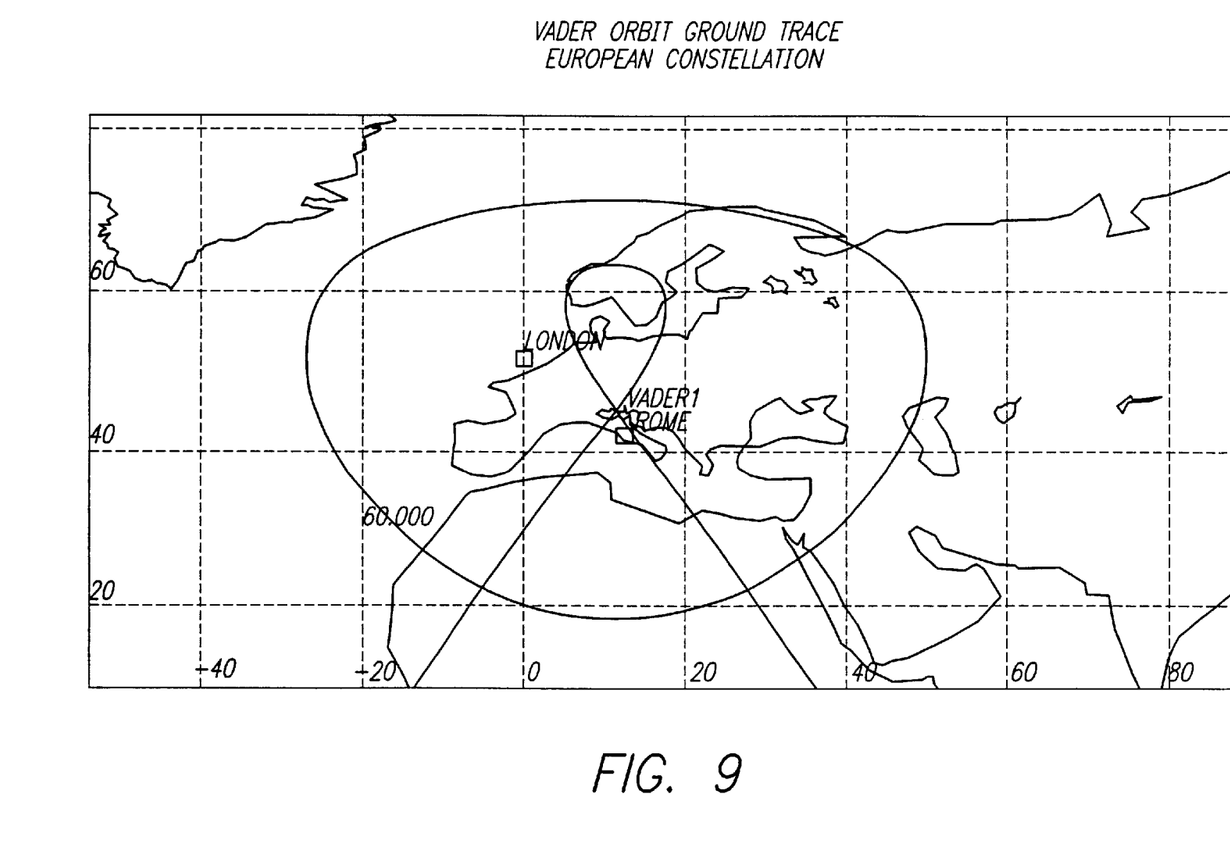
FIG. 9 shows the ground trace for a three satellite constellation serving Europe with FIG. 10–12 showing the high elevation angles achieved in various cities.
Figure 10:
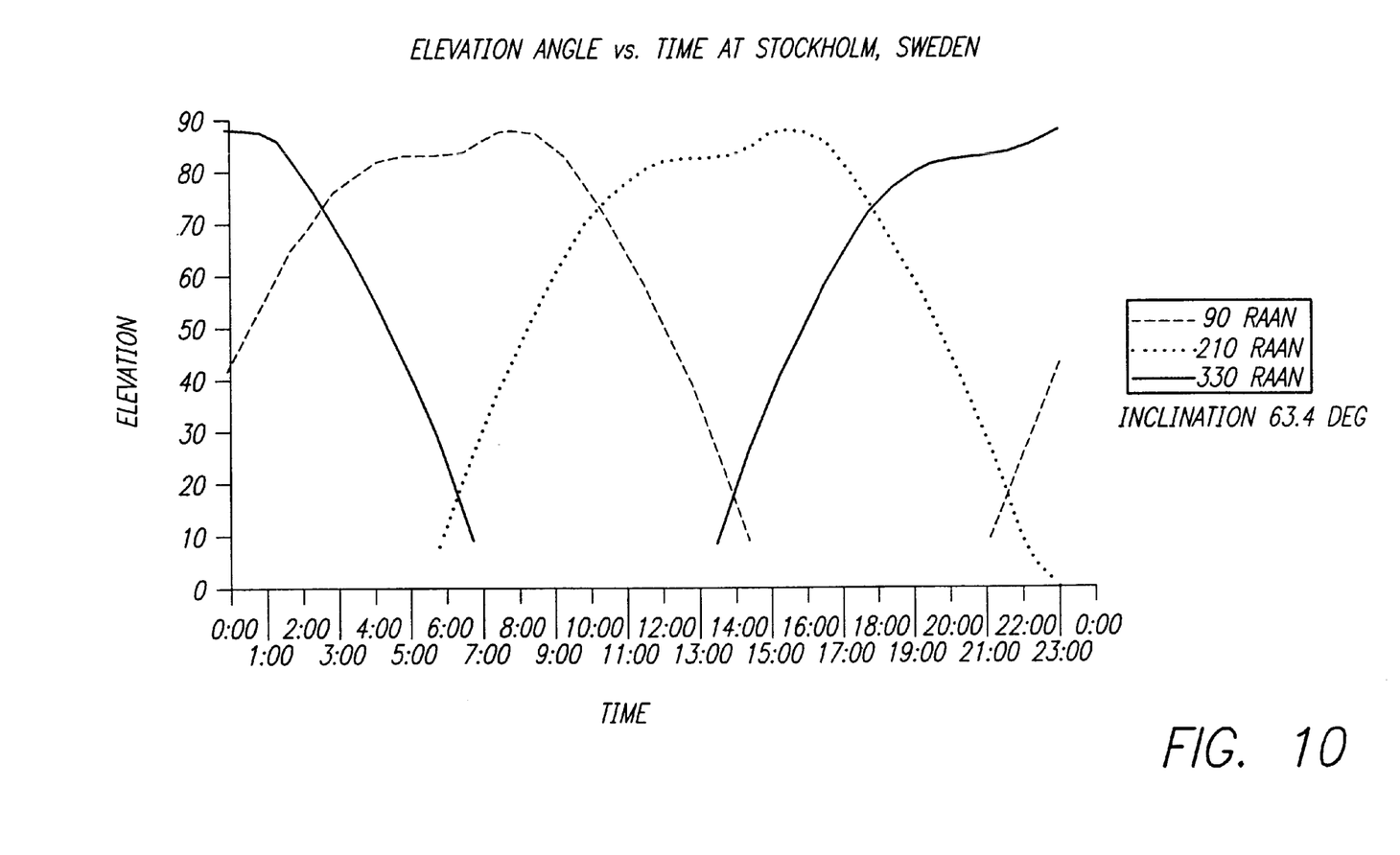
Figure 11:
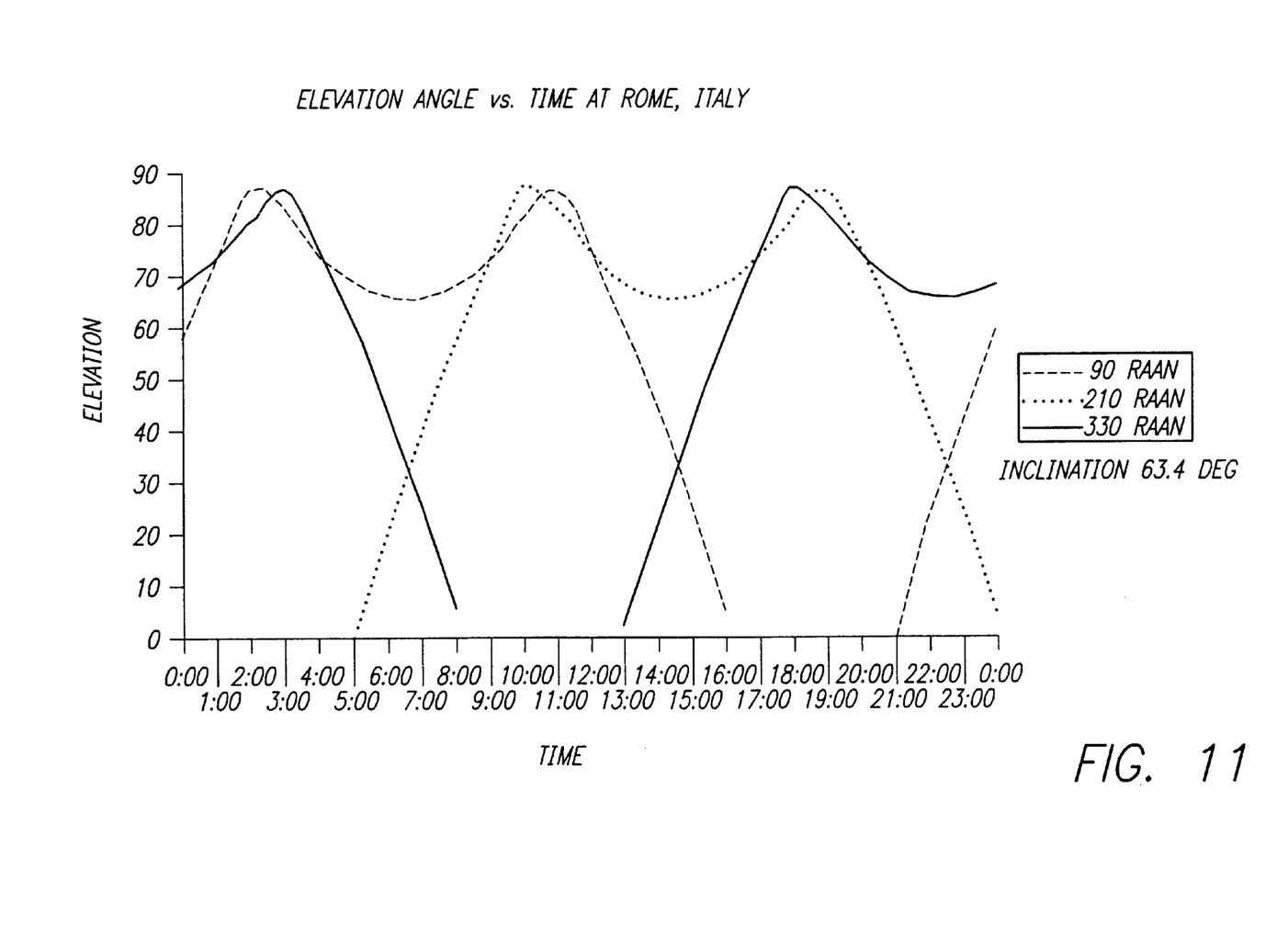
Figure 12:
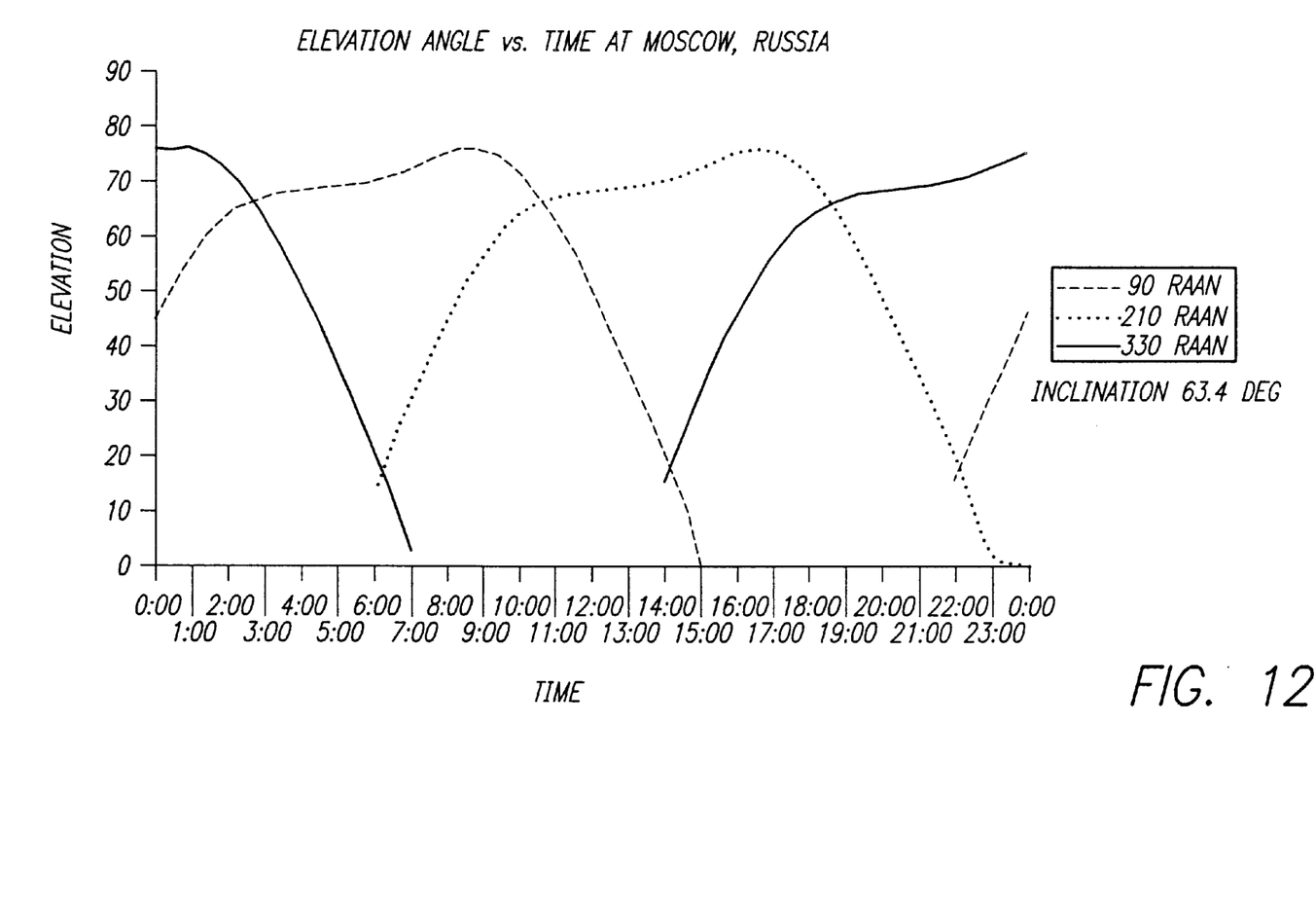

Continuous coverage of a reasonably sized service area well removed from the equator cannot be achieved with a single satellite so analysis is generally performed on constellations with 2, 3 and 4 satellites. The analyses are performed using known computer programs. The amount of elevation angle coverage improvement diminishes for constellations with more than three satellites. Constellations with more than 4 satellites are technically feasible and only marginally improve both elevation angle coverage and redundancy. FIG. 8 shows the elevation angle coverage of a two satellite constellation as seen from New York City. No appreciable satellite spatial diversity is possible making multipath mitigation from this technique unavailable. The selection of the number of satellites in the constellation from the analyses' data is based on the criteria adopted for the minimum required number of satellites visible to mobile receivers throughout the service area at the selected minimum elevation angles. The selection may also be influenced by system costs.

The next analyses take the selected satellite orbit constellation and further optimize it from the viewpoint of orbit perturbations. The purpose of this final optimization is to minimize the satellites' mass, particularly the amount of on-board propellant needed for correcting the orbits from long term perturbations. This is important since both the satellite and its launch vehicle will be less expensive.

The analyses are done by known computer programs. The programs calculate the perturbations of the satellites' orbits caused by the earth's oblateness, the gravity effects of the sun and moon and the solar radiation pressure. Although those effects are individually small on a short term basis, satellites of this type generally have a 15 year lifetime. The magnitude of some of the perturbations are a function of when the satellites are initially placed in orbit (i.e., epoch). The analyses consider which perturbations are additive and which are subtractive, and the minimization of the perturbations by small changes in the initial orbital parameters, particularly inclination and eccentricity, and their subsequent in-orbit correction strategy. The result of the optimization is the amount of satellite on-board fuel required and reflects the minimum satellite mass.

The last analyses involve the optimization of the satellite antenna which is directive towards the service area. The analyses result in the required pointing angle of the satellite antenna boresight with time (i.e., over one sidereal day) to keep it accurately pointed at the service area. Depending on the difference between apogee and perigee altitude, if the apogee is very high, the analyses provide the beamshaping of the satellite antenna with time required to offset the change in range (i.e., space propagation loss change) and also provide antenna pattern rotation requirements with time for antenna beamshapes which are not circular.

Two systems using this invention were designed for audio satellite broadcasting. One system was designed for service to the contiguous 48 United States. The input requirements were to have one satellite in the northern portion of the service area always in view with at least 60° elevation angle to mobile receivers in the area and a second satellite always visible with at least 25° elevation angle. The analyses were conducted with an orbital computation program called "Satellite Tool Kit" from Analytical Graphics, Inc. of Malvern, Pa. The results of the analyses resulted in a three satellite constellation. FIGS. 2 through 7 show specific final elevation angle coverage outputs of the program for the system.

A second system was designed for service to Europe using similar input requirements to the first system and the same computation program. FIGS. 9 through 12 reflect the final results regarding elevation angle coverage.

What is claimed is:

1. A method of providing satellite broadcasts to mobile receivers at or near the surface of the earth in a targeted geographical service area that is, at least in part, in a latitude above about 30° N or in a latitude below about 30° S, comprising:

providing a constellation of two or more satellites with each satellite (1) during a part of its orbit, having elevation angles of at least about 35° in at least a part of said targeted geographic service area; (2) having an orbit with a periodicity substantially the same as the period of rotation of the earth on its axis;

broadcasting from a satellite source in said constellation at an elevation angle or angles greater than or equal to approximately 35°, on one path, a signal having a frequency in the range of about 1 to 4 GHz that includes audio program information;

substantially simultaneously broadcasting from another satellite source in said constellation at an elevation angle or angles greater than or equal to approximately 35°, on a different path, another signal having a frequency in the range of about 1 to 4 GHz that includes substantially the same audio program information; and providing a time delay between said signals, said time delay being of sufficient length to reduce outages in substantial parts of said service area;

and assembling and producing an output signal comprising audio program information derived from said satellite broadcast signals at a plurality of mobile receivers located in said service area.

2. The method of claim 1, where the broadcasts from the two said satellite sources are at substantially the same frequency.

3. A satellite broadcast system for mobile receivers in a targeted geographical service area at latitudes above about 30° N or in a latitude below about 30° S, comprising:

a constellation of two or more satellites with each satellite (1) during a part of its orbit, having an elevation angle or angles of at least about 35° in at least a part of said targeted geographic service area; (2) having an orbit with a periodicity substantially the same as the period of rotation of the earth on its axis;

a satellite source in said constellation at an elevation angle or angles greater than or equal to approximately 35°, for broadcasting on one path, a signal having a frequency in the range of about 1 to 4 GHz that includes audio program information;

another satellite source in said constellation at an elevation angle or angles greater than or equal to approximately 35°, for substantially simultaneously broadcasting, on a different path, another signal having a frequency in the range of about 1 to 4 GHz that includes substantially the same audio program information, with a time delay between said signals, said time delay being of sufficient length to reduce outages in substantial parts of said service area; and a plurality of mobile receivers for receiving the broadcast signals, said plurality of mobile receivers located in said service area at or near the surface of the earth, each of said plurality of mobile receivers being adapted to produce an output signal comprising audio program information derived from said satellite broadcast signals.

4. The satellite audio broadcasting system of claim 3 wherein said audio program information from said constellation is in the frequency range of about 1 to about 4 GHz.

5. The satellite audio broadcasting system of claim 3 or claim 4 wherein the satellites in said constellation are in orbital planes separated from one another by a number of degrees equal to 360° divided by the number of satellites in said constellation.

6. The satellite broadcasting system of claim 3 or claim 4 wherein said orbital parameters for at least one satellite in said constellation minimize passage of said satellite through the Van Allen radiation belts around the earth.

7. The satellite audio broadcasting system of claim 3 or claim 4 wherein said orbital parameters minimize onboard satellite propulsion required to maintain each satellite in said constellation in its desired orbit.

8. The satellite audio broadcasting system of claim 3 or claim 4 wherein said orbital parameters are selected from the group consisting of satellite antenna pointing angles, satellite pattern rotation angles and satellite antenna beam shapes.

9. The satellite audio broadcasting system of claim 3 or claim 4 wherein said orbital parameters are selected from the group consisting of the inclination of each satellite, the eccentricity of the orbit for each satellite, the argument of perigee for each satellite in said constellation, the longitude of the ascending node of each orbit for each satellite in said constellation, and the ground trace for each satellite in said constellation.

10. A method of providing satellite broadcasts to mobile receivers at or near the surface of the earth in a targeted geographical service area that is, at least in part, in a latitude above about 30° N or in a latitude below about 30° S, comprising:

providing a constellation of two or more satellites with each satellite (1) during a part of its orbit, having an elevation angle or angles of at least about 35° in at least a part of said targeted geographic service area; (2) having an orbit with a periodicity substantially the same as the period of rotation of the earth on its axis;

broadcasting from a satellite source in said constellation at an elevation angle or angles greater than or equal to approximately 35°, on one path, a signal having a frequency in the range of about 1 to 4 GHz that includes audio program information;

substantially simultaneously broadcasting from another satellite source in said constellation at an elevation angle or angles greater than or equal to approximately 35°, on a different path, said different path being spaced from said satellite source and said first path sufficiently to reduce blockage and foliage attenuation and to facilitate signal reception at the earth's surface, while said satellite sources are broadcasting; and assembling and producing an output signal comprising audio program information derived from said satellite broadcast signals at a plurality of mobile receivers located in said service area.

11. The method of claim 10, comprising broadcasting said signals with frequencies that are substantially different one from the other.

12. The method of claim 10, comprising broadcasting said signals with frequencies that are substantially the same.

13. The method of claim 10 or claim 11 or claim 12 further comprising broadcasting said signal and said another signal at different polarizations but with substantially the same frequency.

14. The method claim 10 or claim 11 or claim 12 comprising broadcasting signals wherein one of the two satellite sources comprises at least two separate satellites.

15. The method of claim 10 or claim 11 or claim 12 wherein said assembling step comprises selection of said signal and said another signal as the basis for the output from at least one of said receivers.

16. The method of claim 10 or claim 11 or claim 12 wherein said assembling step comprises combining said signal and said another signal.

17. A satellite broadcast system for mobile receivers in a targeted geographical service area at latitudes above about 30° N or below about 30° S comprising:

a constellation of two or more satellites with each satellite (1) during a part of its orbit, having an elevation angle or angles of at least about 35° in at least a part of said targeted geographic service area; (2) having an orbit with a periodicity substantially the same as the period of rotation of the earth on its axis;

a satellite source in said constellation at an elevation angle or angles greater than or equal to approximately 35°, for broadcasting on one path, a signal having a frequency in the range of about 1 to 4 GHz that includes audio program information;

another satellite source in said constellation at an elevation angle or angles greater than or equal to approximately 35°, for substantially simultaneously broadcasting, on a different path, another signal having a frequency in the range of about 1 to 4 GHz that includes substantially the same audio program information, said different path being spaced from said satellite source and said first path sufficiently to reduce blockage and foliage attenuation and to facilitate signal reception at the earth's surface, while said satellites are broadcasting; and a plurality of mobile receivers for receiving the broadcast signals, said plurality of mobile receivers located in said service area at or near the surface of the earth, each of said plurality of mobile receivers being adapted to produce an output signal comprising audio program information derived from said satellite broadcast signals.

18. The system of claim 17 in which said signals have frequencies that are substantially different one from the other.

19. The system of claim 17 in which said signals have frequencies that are substantially the same.

20. The system of claim 17 or claim 18 or claim 19 wherein said mobile receivers select the stronger of said signal and said other signal.

21. The system of claim 17 or claim 18 or claim 19 wherein said signal and said another signal are at different polarizations but have substantially the same frequency.

22. The system of claim 17 or claim 18 or claim 19 wherein one of the two satellite sources comprises at least two separate satellites.

23. The system of claim 17 or claim 18 or claim 19 wherein said receiver combines said signal and said another signal.

24. The system of claim 17 or claim 18 or claim 19 wherein said receiver selects from said signal and said another signal as the basis for the output from at least one of said receivers.

25. The system of claim 17 or claim 18 or claim 19 wherein the time delay is in the range of approximately one second to approximately five minutes.

26. A method of providing satellite broadcasts to mobile receivers at or near the surface of the earth in a targeted geographical service area that is, at least in part, in a latitude above about 30° N or in a latitude below about 30° S, comprising:

providing a constellation of two or more satellites with each satellite (1) during a part of its orbit, having an elevation angle or angles of at least about 35° in at least a part of said targeted geographic service area; (2) having an orbit with a periodicity substantially the same as the period of rotation of the earth on its axis;

broadcasting from a satellite source in said constellation at an elevation angle or angles greater than or equal to approximately 35°, on one path, a signal having a frequency in the range of about 1 to 4 GHz that includes audio program information;

substantially simultaneously broadcasting from another satellite source in said constellation at an elevation angle or angles greater than or equal to approximately 35°, on a different path, said different path being spaced from said satellite source and said first path sufficiently to reduce blockage and foliage attenuation and to facilitate signal reception at the earth's surface, while said satellite sources are broadcasting;

providing a time delay between said signals, said time delay being of sufficient length to reduce outages in substantial parts of said service area; and assembling and producing an output signal comprising audio program information derived from said satellite broadcast signals at a plurality of mobile receivers located in said service area.

27. The method of claim 26 comprising broadcasting said signal and said another signal are at different frequencies.

28. The method of claim 26 comprising broadcasting said signal and said another signal from a common terrestrial transmission source.

29. The method of claim 26 further comprising providing a time delay in the range of about 1 second to about 5 minutes.

30. A satellite broadcast system for mobile receivers in a targeted geographical service area at latitudes above about 30° N or below about 30° S comprising:

a constellation of two or more satellites with each satellite (1) during a part of its orbit, having an elevation angle or angles of at least about 35° in at least a part of said targeted geographic service area; (2) having an orbit with a periodicity substantially the same as the period of rotation of the earth on its axis;

a satellite source in said constellation at an elevation angle or angles greater than or equal to approximately 35°, for broadcasting on one path, a signal having a frequency in the range of about 1 to 4 GHz that includes audio program information;

another satellite source in said constellation at an elevation angle or angles greater than or equal to approximately 35°, for substantially simultaneously broadcasting, on a different path, another signal having a frequency in the range of about 1 to 4 GHz that includes substantially the same audio program information, said different path being spaced from said satellite source and said first path sufficiently to reduce blockage and foliage attenuation and to facilitate signal reception at the earth's surface, while said satellites are broadcasting;

providing a time delay between said signals, said time delay being of sufficient length to reduce outages in substantial parts of said service area; and a plurality of mobile receivers, with the capability of storing, in each of said mobile receivers, at least one of said signals and outputting from each of said plurality of mobile receivers said audio program information from said signals by combining the signals for output or by selecting for output, in correct time-ordered progression, portions of said signals.

31. The system of claim 30 further comprising a buffer shift register for storing at least one of said signals.

32. The system of claim 30 further comprising buffer storage and a delay synchronizer connected to said buffer storage for storing at least one of said signals.

33. The system of claim 30 in which at least some of said mobile receivers combine said two signals, or select for output, portions of one signal and portions of another signal to provide a time-ordered stream.

34. The system of claim 30 wherein said signals are analog or digital, have any desired modulation, are the same or differ in frequency, and include timing information for storage derived from the signals.

35. The system of claim 30 in which at least some of said mobile receivers select the stronger signal from said signal and said another signal for output.

36. The system of claim 30 wherein at least some of said mobile receivers combine said signal and said another signal.

37. The system of claim 30 or claim 31 or claim 32 or claim 33 or claim 34 wherein said time delay is in the range of about one second to about five minutes.

* * * * *